United States Patent
Baker

(10) Patent No.: US 11,238,577 B2
(45) Date of Patent: Feb. 1, 2022

(54) VIDEO DYNAMIC RANGE ANALYSIS

(71) Applicant: Project Giants, LLC, Beaverton, OR (US)

(72) Inventor: Daniel G. Baker, Beaverton, OR (US)

(73) Assignee: PROJECT GIANTS, LLC, Beaverton, OR (US)

( * ) Notice: Subject to any disclaimer, the term of this patent is extended or adjusted under 35 U.S.C. 154(b) by 0 days.

(21) Appl. No.: 16/840,169

(22) Filed: Apr. 3, 2020

(65) Prior Publication Data
US 2020/0320678 A1 Oct. 8, 2020

Related U.S. Application Data

(60) Provisional application No. 62/830,351, filed on Apr. 5, 2019.

(51) Int. Cl.
*G06T 7/00* (2017.01)

(52) U.S. Cl.
CPC .. *G06T 7/0002* (2013.01); *G06T 2207/10016* (2013.01); *G06T 2207/10024* (2013.01); *G06T 2207/20* (2013.01)

(58) Field of Classification Search
CPC ......... G06T 7/0002; G06T 2207/10016; G06T 2207/10024; G06T 2207/20; G06T 2207/20208; G06T 5/007; H04N 17/004
See application file for complete search history.

(56) References Cited

U.S. PATENT DOCUMENTS

| 7,609,320 B2 * | 10/2009 | Okamura | H04N 5/2355 348/362 |
| 2004/0057632 A1 * | 3/2004 | Gindele | H04N 1/407 382/274 |
| 2005/0030306 A1 * | 2/2005 | Lan | G09G 5/363 345/211 |
| 2008/0273787 A1 * | 11/2008 | Ducksbury | G06T 7/90 382/133 |
| 2010/0054611 A1 * | 3/2010 | Nomura | G06K 9/6212 382/224 |

(Continued)

FOREIGN PATENT DOCUMENTS

| EP | 1400921 A2 | 3/2004 |
| EP | 1400921 A3 | 11/2005 |

(Continued)

OTHER PUBLICATIONS

International Search Report and Written Opinion of the International Searching Authority issued in International Application No. PCT/US2020/026725, dated May 28, 2020, 11 pages.

*Primary Examiner* — Kim Y Vu
*Assistant Examiner* — Molly Delaney
(74) *Attorney, Agent, or Firm* — Miller Nash LLP

(57) ABSTRACT

A video analyzer measures and outputs a visual indication of a dynamic range of a video signal. The video analyzer includes a video input to receive the video signal and a cumulative distribution function generator generates a cumulative distribution function curve from a component of the video signal. A feature detector generates one or more feature vectors from the cumulative distribution function curve and a video dynamic range generator produces a visual output indicating a luminance of one or more portions of the video signal.

20 Claims, 5 Drawing Sheets

(56) References Cited

U.S. PATENT DOCUMENTS

| | | | |
|---|---|---|---|
| 2015/0287216 A1* | 10/2015 | Baker | G06T 5/007 |
| | | | 382/162 |
| 2017/0011277 A1* | 1/2017 | Nakashima | G06T 3/4007 |
| 2018/0098094 A1* | 4/2018 | Wen | H04N 19/136 |
| 2019/0005324 A1* | 1/2019 | Anisimovskiy | G06K 9/6212 |
| 2019/0014312 A1* | 1/2019 | Hubbard | H04N 17/004 |
| 2019/0272643 A1* | 9/2019 | Gadgil | G06T 9/00 |

FOREIGN PATENT DOCUMENTS

| | | |
|---|---|---|
| EP | 2928177 A1 | 10/2015 |
| EP | 3425908 A1 | 1/2019 |
| GB | 2357649 A | 6/2001 |

\* cited by examiner

VIDEO DYNAMIC RANGE ANALYSIS

PRIORITY

This disclosure claims benefit of U.S. Provisional Application No. 62/830,351, titled "REAL-TIME VIDEO DYNAMIC RANGE ANALYSIS," filed on Apr. 5, 2019, which is incorporated herein by reference in its entirety.

FIELD OF THE INVENTION

This disclosure is directed to systems and methods for measuring video signals, and in particular, to automatically analyzing a dynamic range of a video signal.

BACKGROUND

Televisions (TVs) have rapidly improved in display size and resolution over the original 1080×1920 high definition (HD) format with the advent of 4K and 8K consumer displays, which can support content from streaming data services with 4K resolution. However, it can be difficult to perceive and fully appreciate these new high-resolution improvements on typical living room screen sizes at typical viewing distances, making further improvements on image resolution moot.

As such, advancement in video technology has focused on exploiting the wider color gamut (WCG) and, in particular, the much wider contrast and peak brightness High Dynamic Range (HDR) of modern displays since these create a very noticeable improvement in viewer experience, which can easily be appreciated at typical living room viewing distances and lighting.

HDR video content providers are working at a rapid pace to convert classic film archives, which have always had a more dynamic range than Standard Dynamic Range (SDR) video, to the new HDR formats for video DVD and streaming services. Further, today's cameras have a very large dynamic range, allow for both live broadcast and video production recording of HDR content, as well as simulcast of SDR content for those who do not have an HDR TV.

Currently, there are three popular display formats for HDR/WCG content and two WCG formats. High-end studio reference display monitors, otherwise known as pix monitors, can display input in one or more of these formats directly.

HDR/WCG content is sourced from a wide range of camera, film, and digital archive formats that differ from the HDR/SDR pix monitor input formats. As such, adjustments are needed in the red, green, and blue (RGB) brightness, contrast, color saturation, and gamma to either compress or expand the dynamic range and color space to fit one of the pix monitor formats.

Embodiments of the disclosure address these and other deficiencies of the prior art.

BRIEF DESCRIPTION OF THE DRAWINGS

Aspects, features and advantages of embodiments of the present disclosure will become apparent from the following description of embodiments in reference to the appended drawings in which.

DESCRIPTION

Figure 1:
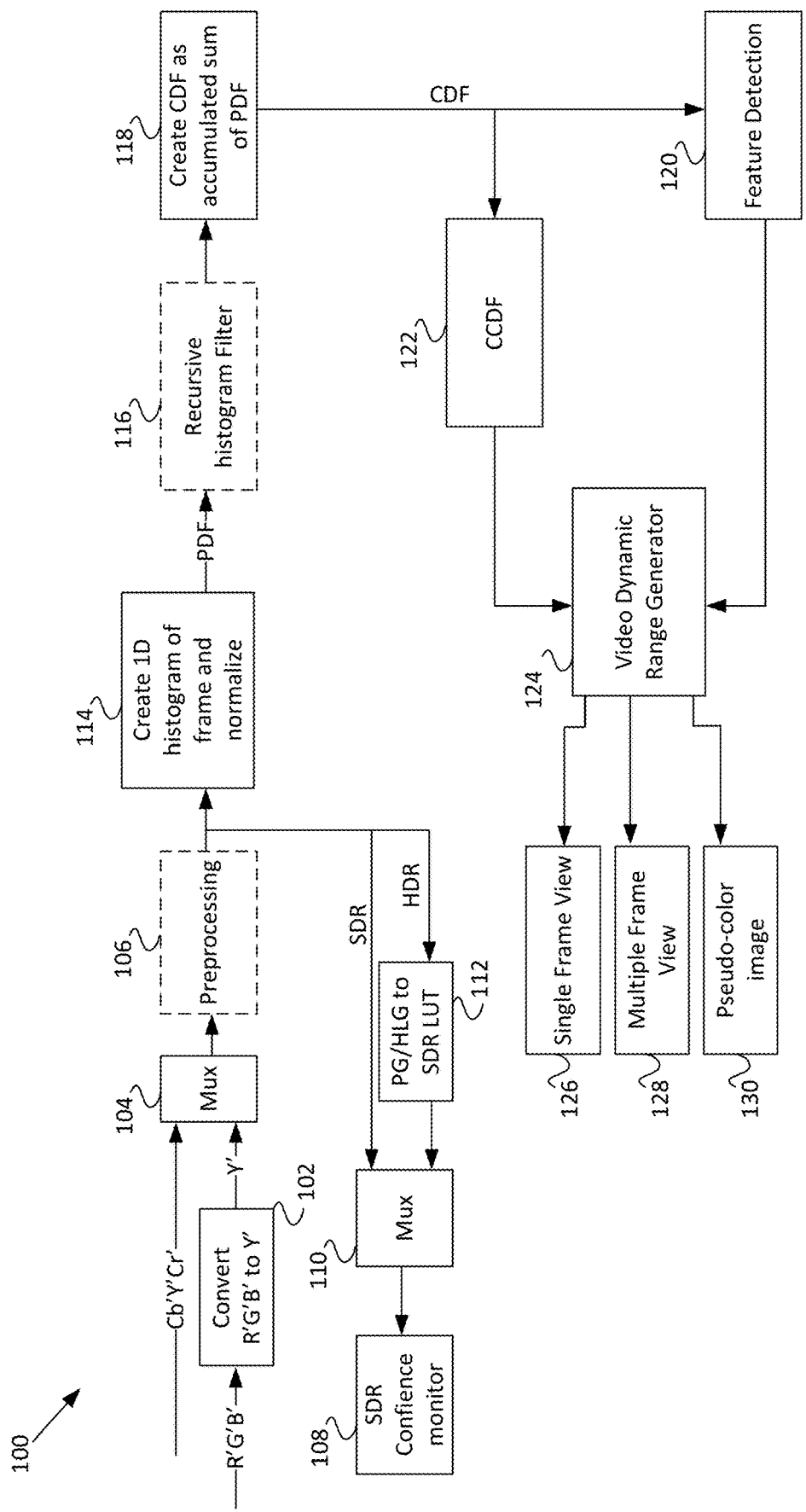
FIG. 1 is a block diagram of a real-time video dynamic range analysis system according to embodiments of the disclosure.

As mentioned above, high-end studio reference display monitors, also referred to herein as pix monitors, can display input in one or more formats. The formats include, for example, HDR pix monitor display "gamma" formats or WCG pix monitor color-primary formats.

The HDR pix monitor display "gamma" formats can include perceptually quantized (PQ) graded for 1000 to 4000 nit peak brightness; hybrid log gamma typically graded for 1000 nit peak brightness; and SRLive typically graded for 1200 nit peak brightness. The SCG pix monitor color-primary formats can include a BT.2020 with fully saturated "laser" light purity display primaries, which must be limited since display primaries of current picture monitors cannot achieve pure RGB light, and P3-D65 with wide color gamut but achievable display primaries short of laser light purity.

The HDR/WCG content is sourced from a wide range of camera, film, and digital archive formats that differ from the HDR/SDR pix monitor input formats. Therefore, as mentioned above, adjustments are needed in the RGB brightness, contrast, color saturation, and gamma to either compress or expand the dynamic range and color space to fit one of the pix monitor gamma formats.

Additionally, the luminance in the image should be quantified according to display area to ensure that HDR/WCG content does not exceed limits of the target display technology. However, it can be difficult to measure luminance of video images that may have very bright highlights that occupy only a small pixel area or scenes that appear too dark for TVs in room that are not very dark as compared to a movie theater.

Modern TV pix monitors are limited in the display power or luminous intensity they can provide on their very large screens. For example, a seventy inch diagonal television or pix monitor advertised to be capable of displaying a peak luminance of 2000 nits (cd/m^2) may only be able to delivery that peak luminance at less than two percent of the screen area. In other words, the television or pix monitor cannot display a white field of 2000 nits over the entire screen since it would take too much power given the display technology.

Embodiments of the disclosure provide systems and methods to determine the scene luminance as a function of the image area to allow adjustment of the highlight content as well as the average luminance while grading HDR content for target HDR display gamma format or down-conversion to SDR. Preferably, the systems and methods run in real-time for quality control checking and graphing of content over an entire video sequence.

Other aspects of embodiments of the disclosure provide real-time luminance markers associated with particular regions of interest in the image to quantify the luminance of desired mid-tone, specular highlights, and other regions of interest, such as flesh tone exposure. In some embodiments, these markers may be selected on the basis of the pix area and with pix area display indication such as pseudo-color insertion.

Other aspects of embodiments can provide a method to determine if the limited luminous intensity of target pix display monitors has been exceeded.

FIG. 1 is a block diagram of a real-time video dynamic range analysis example system 100 according to some embodiments of the disclosed technology. The system 100 can analyze video content in real-time and determine scene luminance as a function of the image area to allow a user to quickly identify if adjustments should be made to highlight content as well as the average luminance while grading HDR content for HDR display gamma format or down-conversion to SDR. The system may receive either a Cb'Y'Cr' signal or an R'G'B' signal which can be converted to a luminance, Y', signal in a converter 102. A multiplexer 104 can select the luminance, or Y' component, from either the Cb'Y'Cr' signal or the converted R'G'B' signal.

Optional preprocessing 106 may be performed on the Y' component to either size it to a different format or perform letter-box detection and cropping to an active pix. The pixel count for the subsequent processing needs only to be sufficient to provide a reasonable pixel count for screen areas down to, for example, 0.01 percent. Areas smaller than this, even on typical large screens, would not generally be of interest in terms of peak brightness. For example, resizing 4K or 2K images to 720×1280 still provides about 92 pixels for 0.01% area resolution.

Further, the system 100 may only be interested in active image pixels in some embodiments so any letter box (side panels or top/bottom black bands) should be detected and gated out for subsequent pixel processing. After the preprocessing 106, the SDR or HDR luminance component Y' can be sent to an SDR confidence monitor 108 through a multiplexer 110 and a look up table 112, if the Y' component is an HDR Y' component. The look up table 112 can down-convert the HDR Y' component to SDR and the SDR confidence monitor 108 provides a video picture confidence monitoring function, which can be displayed coincident with a real-time cumulative distribution function (CDF) or a complementary cumulative distribution function (CCDF), which will be discussed in more detail below. This may be a full-color image or a monochrome image with pseudo-color to mark luminance regions.

In some embodiments, a one-dimensional histogram is produced 114 over a range of input data code-values. The one-dimensional histogram is similar to a probability density function (PDF) and is a vector of pixel counts over a single frame for each input code-value and then normalized to fractional values with cumulative sum of unity.

In some embodiments, an optional recursive histogram filter 116 is applied the one-dimensional histogram by providing temporal averaging of the histogram vector with itself. For example, a recursive low pass filter (LPF) is shown whereby each bin of the histogram is averaged (auto-regressive) with its value from previous frames creating a first-order exponential step response. A moving ensemble average temporal LPF with a finite impulse response may provide the same benefit.

A cumulative density function (CDF) 118, which may also be referred to as a cumulative histogram, is generated as the cumulative sum. Since the averaged histogram has a unity sum, the CDF will be a monotonically increasing function from zero to one as in the traditional statistical function.

From the output of the CDF 118, a feature detection 120 generates a set of real-time, dynamic marker values, such as luminance, stops, and input code-values (CV), at predetermined pix areas for each frame by searching the CDF for the CV bin that is closest to each of a predetermined set of pixel probabilities, which is effectively a set of screen area fractions or percentages. The input CV values can act as pseudo-color thresholds to indicate each marker's predetermined pixel area on the pix display in real-time.

A CDF waveform can be graphed from the feature detection 120 based on the set of real-time dynamic marker values. The CDF waveform graphs the input CV versus the pixel probabilities determined by the feature detection 120, or, the input CV may be converted to a full scale percentage and the pixel probabilities can be converted to nits or stops using a known gamma format of the video signal.

In some embodiments, a complementary CDF (CCDF) 122 may also be used to associate image area with an input CV. The CCDF 122 is determined by subtracting the CDF from one, i.e. 1−CDF=CCDF. Then, the CCDF 122 and the feature detection 120 outputs are received at a video dynamic range generator 124. The video dynamic range generator 124 produces a visual output indicating a luminance of one or more portions of the video signal in a form that can be viewed by a user of the system 100.

The video dynamic range generator 124 can produce visual output for a single frame 126 of a video input, which may include graphing amount of nits, stops, or input CV values versus percentage of screen area or log probability, as determined by the feature detection 120. Since the input encoding gamma format is often known, the CV scale which is output by the CDF 118 or CCDF 120 may be converted to display light (nits) or scene reference (stops or reflectance) for reference to the point of use in the video production, quality control, and distribution workflow. The gamma format may be received from metadata of the input signal or may be input by a user. The visual output for the signal frame can allow a user to readily recognize image areas that may contain HDR highlight that exceed typical display peak brightness or content that may not be easily down-converted to SDR.

The video dynamic range generator 124 produces the visual output in real-time or near-real time, meaning the visual output is produced as the video signal is being input to the system 100, or as soon as possible after receiving the signal, to provide time for the creation of the visual output. In other embodiments the outputs of the video dynamic range generator 124 may be temporarily stored for later analysis, or even stored indefinitely.

The video dynamic range generator 124 can also produce a visual output for multiple frames 128 of a video input, which may include graphing an amount of nits versus frames, such as an average luminance for each frame, a maximum peak luminance for each frame, and a minimum luminance for each frame. The multiple frame output 128 can also allow a user to recognize scenes with average luminance (large areas) that are either uncomfortably bright or dark for normal viewing conditions.

The video dynamic range generator 124 may additionally or alternatively produce a visual output of a pseudo-image or pseudo-color image for a frame of the video input by color-coding the image with luminance based on the amount of luminance present in different portions of the image. The pseudo-color image output 130 can visually correlate HDR highlights with real-time luminance nit values.

In some embodiments, a power limit mask may also be determined for a particular display and displayed concurrently on the visual output to allow a user to quickly and easily ascertain if the input video has portions that are too bright or too dark for a particular display.

The display power limitations can be determined using any known operations or methods. When manufacturers specify maximum luminance in nits for televisions or monitors, they are typically specified for a certain area of the television or monitor screen.

In equation (1) below, a maximum luminance (Lmax) may be 2500, 1500, and 1000 nits specified for less than 2% of the screen area for three different displays. Equation (2) notes that 1 nit is equal to 1 candela per square meter.

$$\text{Max display luminance } L\text{max} := \begin{pmatrix} 2500 \\ 1500 \\ 1000 \end{pmatrix} \text{max nits} < 2\% \text{ area} \quad (1)$$

$$1 \text{ nit} = 1 \text{ cd/m}^2 \quad (2)$$

For a 16×9 aspect ratio television or monitor, the diagonal length is 70 inches, and equation (3) converts the diagonal length D to meters.

$$D \text{ in meters} := 70 \cdot \frac{2.54}{100} \quad (3)$$

Equation (4) shown below then determines the area of the television or monitor based on the diagonal length.

$$\text{area}(D) := D^2 \cdot \cos\left(\text{atan}\left(\frac{9}{16}\right)\right) \cdot \sin\left(\text{atan}\left(\frac{9}{16}\right)\right) \quad (4)$$

Using equation (4) above, the area for a 70 inch television or monitor is 1.341 m².

The peak luminosity, Plum, is determined in equation 5 by multiplying the maximum luminosity by 2% of the area.

$$\text{Plum} := L\text{max} \cdot A\text{max} \cdot 0.02 \quad (5)$$

For the above three displays, the peak luminosity is shown in equation (6) below:

$$Plum = \begin{pmatrix} 67.541 \\ 40.524 \\ 27.016 \end{pmatrix} \text{candelas} \quad (6)$$

The peak luminosity in candelas can be converted to nits, as shown in equation (7).

$$Lfs := \frac{Plum}{A\text{max}} \quad (7)$$

For the three displays discussed above, the outcome is shown in equation (8):

$$Lfs = \begin{pmatrix} 50 \\ 30 \\ 20 \end{pmatrix} \text{nits} \quad (8)$$

In equation (9), the maximum number of nits is indicated by I, which in this example is 10,000, i is from 0 to I-1, j is the screen area, which is 2% above, and area for each point, i, is determined by equation (9).

$$\text{Area: } A_i := \frac{i}{I} + 10^{-4} \quad (9)$$

Given the peak luminosity above in equation (5), the maximum luminance for each point can be determined using equation (1).

$$Lum_{i,j} := \frac{Plum_j}{A_i \cdot A\text{max}} \quad Lum_{i,j} := \text{if } (Lum_{i,j} > L_{maxj}, L_{maxj}, Lum_{i,j}) \quad (10)$$

$$\max(Lum) = 2.5 \times 10^3 \min(Lum) = 20 \quad (11)$$

Equations (9) through (11) are used to draw the power limit mask on a generated CDF or CCDF.

Figure 2B:
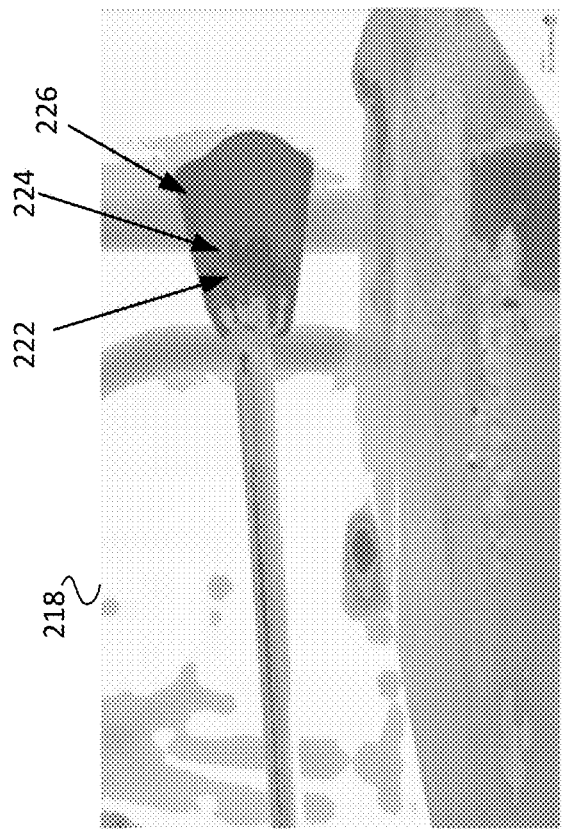
FIGS. 2A and 2B are example outputs of the real-time video dynamic range analysis system of FIG. 1 for a particular video frame.
Figure 2A:
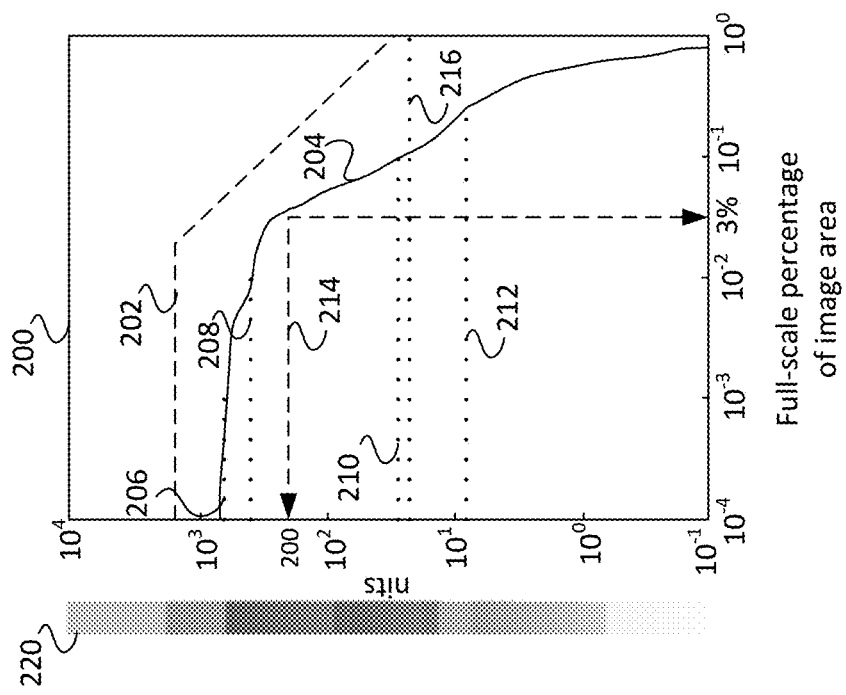

FIG. 2A depicts an exemplary CCDF waveform generated by the system 100 operating on an example frame of an HDR PQ format input video, while FIG. 2B illustrates an example pseudo-color image generated by the system 100. Although the pseudo-color image of FIG. 2B is shown in greyscale, the pseudo-color image in practice may be generated in color, with particular colors indicating various levels of luminance or brightness of the original image. FIG. 2A illustrates a plot 200 of a PQ HDR CCDF display light vs pix area percentage for a frame of a video, which may be an example of the single frame view 126 of FIG. 1. A power limit mask 202, such as one determined above using equations (9)-(11) is shown on the plot for a 1500 nit display. The CCDF waveform 204 is plotted on the plot 200.

A number of markers are illustrated on the plot 200 for ease of discussion, but all of these markers need not be present in a CCDF waveform 204 when displayed to a user. Marker 206 illustrates that 600 nits are present at 0.1% of the display area. Marker 208 illustrates the 1% of the display area point at 400 nits. Marker 210 illustrates the 10% of the display area at 20 nits, and marker 212 illustrates the 25% of the display area at 8 nits. As can be seen by marker 214, 3% of the display area is greater than 200 nits. Marker 216 illustrates the mean marker which is at 18 nits.

As can be seen in the plot 200, the FIG. 218 of FIG. 2B does not violate the 1500 nit area power limit mask. A color-coded key 220 can be provided to allow a user to quickly identify which area of the pseudo-color FIG. 218 corresponds to which portion of the CCDF waveform 204. Arrow 222 illustrates the 0.1% area of greater than 600 nits, while arrow 224 illustrates 1% area with greater than 400 nits and arrow 226 illustrates the HDR region of 3% area with greater than 200 nits.

Figure 3:
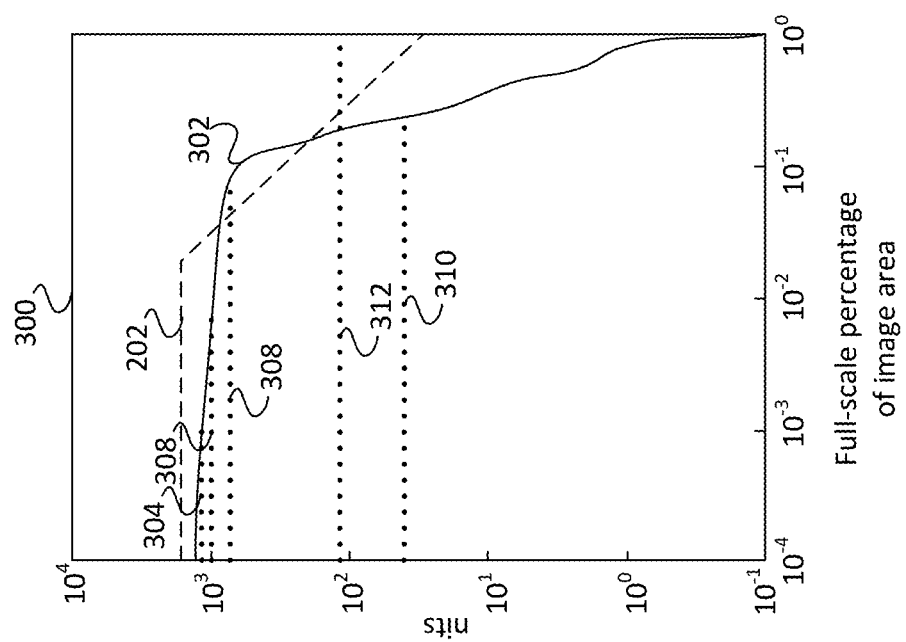
FIG. 3 is another example output of the real-time video dynamic range analysis system of FIG. 1 for another particular video frame.

FIG. 3 illustrates another example of a CCDF waveform 302 for another single frame of the video. The power limit mask 202 is also shown on plot 300. Markers 304, 306, 308, and 310 illustrate the number of nits on the CCDF waveform at area percentages of 0.1%, 1%, 10%, and 25% respectively.

The mean marker 312 is located at 112 nits. As can be seen at marker 308, the image has a greater than 800 nit area of over 10% of the image that exceeds the display power limits, as illustrated by the power limit mask 202. Further, an average luminance (112 nits) of over 100 nits may indicate an uncomfortably bright image to most viewers. Although not shown in FIG. 3, a pseudo-color image 130 may also be displayed concurrently with the plot 300, as well as a key, similar to FIGS. 2A and 2B above.

Figure 4:
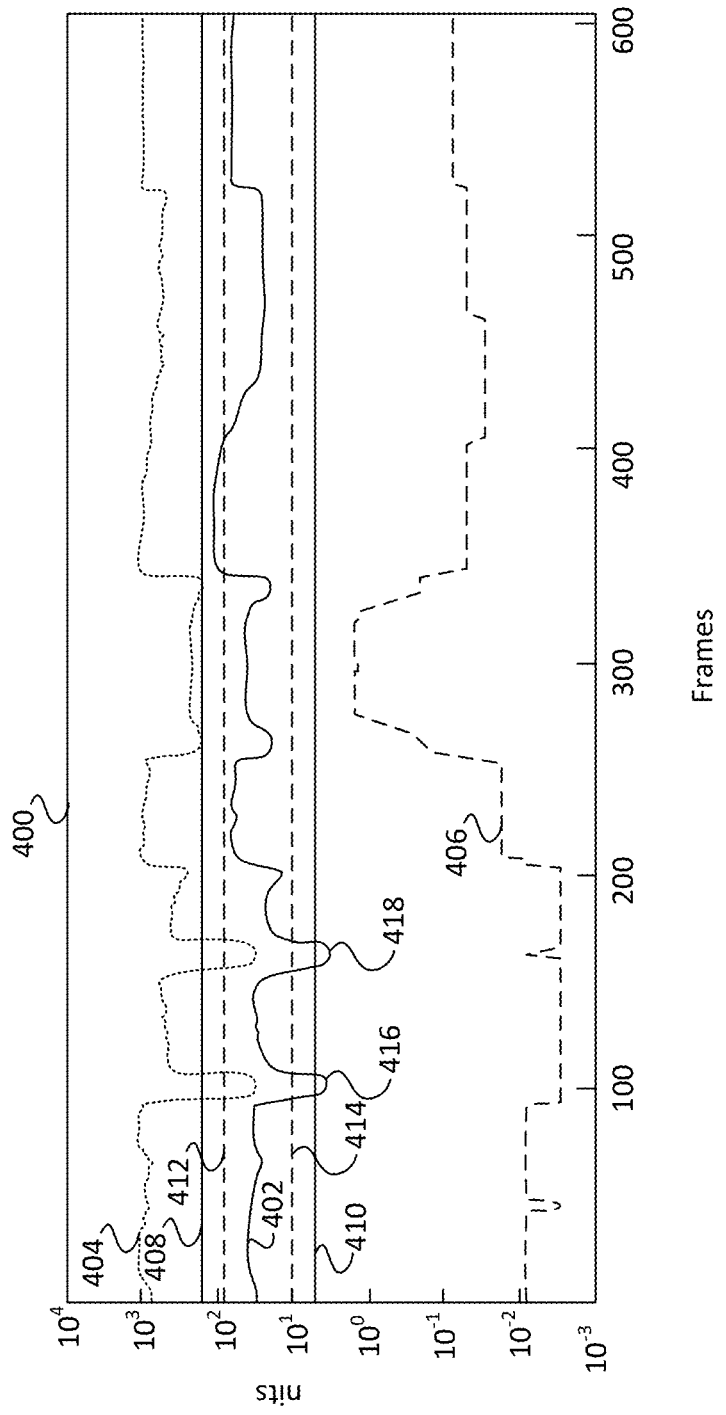
FIG. 4 is an output of a graph of luminance of a video output by the real-time video dynamic range analysis system of FIG. 1.

FIG. 4 is a graph 400 that may be displayed to a user utilizing the system 100 to test whether video content will adequately display on a specific display. The graph 400 is an example of the multiple frame view 128 generated by the video dynamic range generator 124 of FIG. 1. The graph 400 shows an average luminance waveform 402 of the video, peak luminance for less than 1% image area waveform 404, and minimum luminance (peak black) of greater 1% image area waveform 406 measured by system 100 over the entire duration of the video input. The difference between the peaks is the dynamic ranges spanning the dimmest 1% and the brightest 1% of each frame of the video clip. Lines 408 and 410 indicate maximum and minimum luminance for the display, respectively. Lines 412 and 414 indicate the optimum region for luminance for the display.

As can be seen in FIG. 4, the average luminance 402 is graphed over the entirety of 600 frames of a video. The average luminance 402 stays within the maximum and minimum luminance for the display, as indicated by lines 408 and 410, except for two overly dark violations 416 and 418 around approximately 100 frames and 170 frames. A user of the system 100 would be able to see these violations and adjust the video as needed to remedy the violations so the video is able to be properly displayed.

Figure 5:
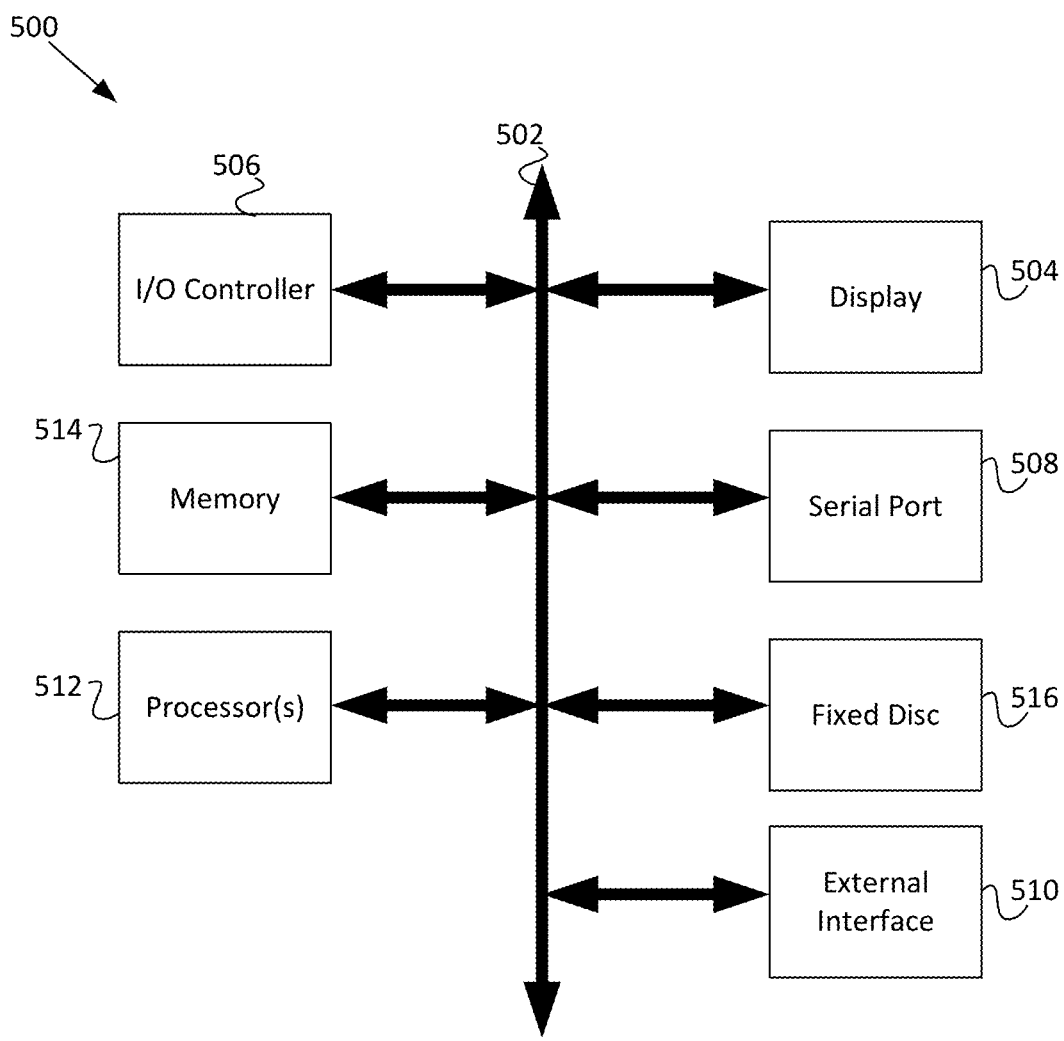
FIG. 5 is an example of a computer device or system used to implement the real-time video dynamic range analysis system of FIG. 1.

FIG. 5 is a diagram illustrating elements or components that may be present in a computer device or system configured to implement a method, process, function, or operation in accordance with an embodiment of the disclosure. As noted, in some embodiments, the system and methods described herein may be implemented in the form of an apparatus that includes a processing element and set of executable instructions. The executable instructions may be part of a software application and arranged into a software architecture. In general, an embodiment of the disclosure may be implemented using a set of software instructions that are designed to be executed by a suitably programmed processing element (such as a CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the system and methods described herein.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the system, apparatus, methods, processes, functions, and/or operations for implementing an embodiment of the disclosure may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment of the disclosure. The subsystems shown in FIG. 5 are interconnected via a system bus 502. Subsystems can include a display 504 and peripherals and input/output (I/O) devices, which couple to an I/O controller 506, can be connected to the computer system by any number of means known in the art, such as a serial port 508. For example, the serial port 508 or an external interface 510 can be utilized to connect the computer device 500 to further devices and/or systems not shown in FIG. 5 including a wide area network such as the Internet, a mouse input device, and/or a scanner. The interconnection via the system bus 502 allows one or more processors 512 to communicate with each subsystem and to control the execution of instructions that may be stored in a system memory 514 and/or the fixed disk 516, as well as the exchange of information between subsystems. The system memory 514 and/or the fixed disk 516 may embody a tangible computer-readable medium. Any or all of the views 126, 128, 130 generated by the video dynamic range generator 124 of FIG. 1 may be shown on the display 504 to a user of the system 500.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set, aside from a transitory waveform. Any such computer readable medium may reside on or within a single computational apparatus, and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers, or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

Example 1 is a video analyzer for measuring dynamic range of a video signal, comprising a video input structured to receive the video signal; a cumulative distribution function generator structured to generate a cumulative distribution function curve from a component of the video signal; a feature detector structured to generate one or more feature vectors from the cumulative distribution function curve; and a video dynamic range generator structured to produce a visual output indicating a luminance of one or more portions of the video signal.

Example 2 is the video analyzer according to example 1, wherein the visual output includes a pseudo-color image indicating the luminance of one or more portions of the video signal.

Example 3 is the video analyzer according to either one of examples 1 or 2, wherein the visual output includes a waveform indicating a luminance versus percentage of screen area for a single frame of the video signal.

Example 4 is the video analyzer according to example 3, wherein the visual output includes a power mask for a particular display displayed concurrently with the waveform.

Example 5 is the video analyzer according to any one of examples 1 to 4, wherein the visual output includes an average luminance of each frame of at least a portion of the video signal.

Example 6 is the video analyzer according to example 5, wherein the visual output further includes a maximum average luminance for a particular display.

Example 7 is the video analyzer according to example 6, wherein the visual output further includes a minimum average luminance for a particular display.

Example 8 is the video analyzer according to example 7, wherein the visual output further includes an optimal maximum luminance and an optimal minimum luminance for a particular display.

Example 9 is the video analyzer according to any one of examples 1 to 8, wherein the visual output is generated and displayed in real-time or near real-time.

Example 10 is a method for measuring dynamic range of a video signal, comprising generating a cumulative distribution function curve from a component of the video signal; generating one or more feature vectors from the cumulative distribution function curve; and producing a visual output indicating a luminance of one or more portions of the video signal.

Example 11 is the method according to example 10, wherein the visual output includes a pseudo-color image indicating the luminance of one or more portions of the video signal.

Example 12 is the method according to either one of examples 10 or 11, wherein the visual output includes a waveform indicating a luminance versus percentage of screen area for a single frame of the video signal.

Example 13 is the method according to example 12, wherein the visual output includes a power mask for a particular display displayed concurrently with the waveform.

Example 14 is the method according to any one of examples 10 to 13, wherein the visual output includes an average luminance of each frame of at least a portion of the video signal.

Example 15 is the method according to example 14, wherein the visual output further includes a maximum average luminance and a minimum average luminance for a particular display.

Example 16 is the method according to any one of examples 10 to 15 in which producing a visual output indicating a luminance of one or more portions of the video signal comprises producing a visual output in real-time or near real-time.

Example 17 is one or more computer-readable storage media comprising instructions, which, when executed by one or more processors of a video analyzer, cause the video analyzer to generate a cumulative distribution function curve from a component of the video signal; produce one or more feature vectors from the cumulative distribution function curve; and generate a visual output indicating a luminance of one or more portions of the video signal.

Example 18 is the one or more computer-readable storage media according to example 17, further comprising instructions to cause the video analyzer to generate a visual output that includes a pseudo-color image indicating the luminance of one or more portions of the video signal.

Example 19 is the one or more computer-readable storage media according to either one of examples 17 or 18, further comprising instructions to cause the video analyzer to generate a visual output that includes a waveform indicating a luminance versus percentage of screen area for a single frame of the video signal.

Example 20 is the one or more computer-readable storage media according to any one of examples 17 to 19, further comprising instructions to cause the video analyzer to generate a visual output that includes a power mask for a particular display displayed concurrently with the waveform.

Example 21 is a video analyzer for measuring dynamic range of a video signal, comprising a video input structured to receive the video signal; a cumulative distribution function generator structured to generate a cumulative distribution function curve from a component of the video signal; a feature detector structured to generate one or more feature vectors from the cumulative distribution function curve; and a video dynamic range generator structured to produce a visual output indicating a luminance of one or more portions of the video signal from the cumulative distribution function curve and from the one or more feature vectors.

Example 22 is a method for measuring dynamic range of a video signal, comprising generating a cumulative distribution function curve from a component of the video signal; generating one or more feature vectors from the cumulative distribution function curve; and producing a visual output indicating a luminance of one or more portions of the video signal from the cumulative distribution function curve and from the one or more feature vectors.

Example 23 is one or more computer-readable storage media comprising instructions, which, when executed by one or more processors of a video analyzer, cause the video analyzer to generate a cumulative distribution function curve from a component of the video signal; produce one or more feature vectors from the cumulative distribution function curve; and generate a visual output indicating a luminance of one or more portions of the video signal from the cumulative distribution function curve and from the one or more feature vectors.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

I claim:

1. A video analyzer for measuring dynamic range of a video signal, comprising:
   a video input structured to receive the video signal;
   a cumulative distribution function generator structured to generate a cumulative distribution function curve from a component of the video signal;
   a feature detector structured to generate one or more feature vectors from the cumulative distribution function curve; and
   a video dynamic range generator structured to produce a visual output indicating a luminance of one or more portions of the video signal based on the one or more feature vectors.

2. The video analyzer according to claim 1, wherein the visual output includes a pseudo-color image indicating the luminance of one or more portions of the video signal.

3. The video analyzer according to claim 1, wherein the visual output includes a waveform indicating a luminance versus percentage of screen area for a single frame of the video signal.

4. The video analyzer according to claim 3, wherein the visual output includes a power mask for a particular display displayed concurrently with the waveform.

5. The video analyzer according to claim 1, wherein the visual output includes an average luminance of each frame of at least a portion of the video signal.

6. The video analyzer according to claim 5, wherein the visual output further includes a maximum average luminance for a particular display.

7. The video analyzer according to claim 6, wherein the visual output further includes a minimum average luminance for a particular display.

8. The video analyzer according to claim 7, wherein the visual output further includes an optimal maximum luminance and an optimal minimum luminance for a particular display.

9. The video analyzer according to claim 1, wherein the visual output is generated and displayed in real-time or near real-time.

10. A method for measuring dynamic range of a video signal, comprising:
   generating a cumulative distribution function curve from a component of the video signal;
   generating one or more feature vectors from the cumulative distribution function curve; and
   producing a visual output indicating a luminance of one or more portions of the video signal based on the one or more feature vectors.

11. The method according to claim 10, wherein the visual output includes a pseudo-color image indicating the luminance of one or more portions of the video signal.

12. The method according to claim 10, wherein the visual output includes a waveform indicating a luminance versus percentage of screen area for a single frame of the video signal.

13. The method according to claim 12, wherein the visual output includes a power mask for a particular display displayed concurrently with the waveform.

14. The method according to claim 10, wherein the visual output includes an average luminance of each frame of at least a portion of the video signal.

15. The method according to claim 14, wherein the visual output further includes a maximum average luminance and a minimum average luminance for a particular display.

16. The method according to claim 10 in which producing a visual output indicating a luminance of one or more portions of the video signal comprises producing a visual output in real-time or near real-time.

17. One or more computer storage media comprising instructions, which, when executed by one or more processors of a video analyzer, cause the video analyzer to:
   generate a cumulative distribution function curve from a component of the video signal;
   produce one or more feature vectors from the cumulative distribution function curve; and
   generate a visual output indicating a luminance of one or more portions of the video signal based on the one or more feature vectors.

18. The one or more computer storage media according to claim 17, further comprising instructions to cause the video analyzer to generate a visual output that includes a pseudo-color image indicating the luminance of one or more portions of the video signal.

19. The one or more computer storage media according to claim 17, further comprising instructions to cause the video analyzer to generate a visual output that includes a waveform indicating a luminance versus percentage of screen area for a single frame of the video signal.

20. The one or more computer storage media according to claim 17, further comprising instructions to cause the video analyzer to generate a visual output that includes a power mask for a particular display displayed concurrently with the waveform.

* * * * *